FIG. I.

INVENTORS
DONALD C. BRUNTON
JOHN M. RICHTER
BY Munson H. Lane
ATTORNEY

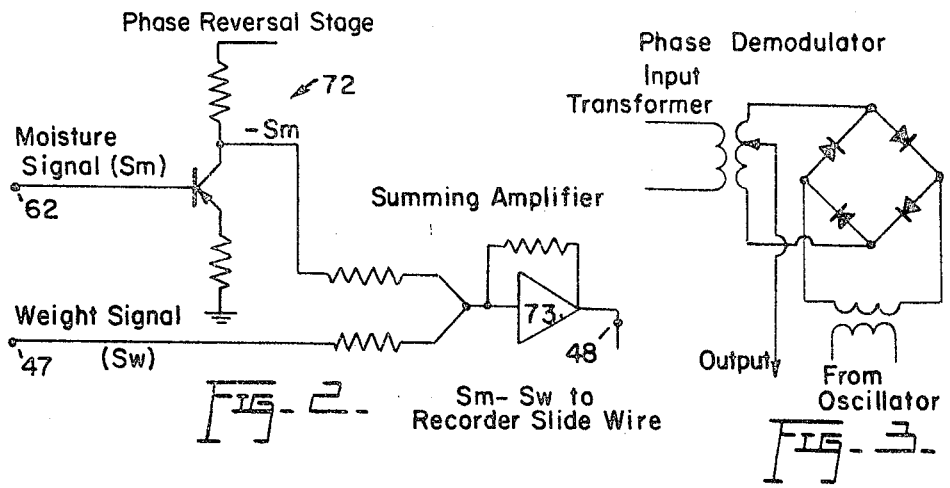
FIG-2.
FIG-3.
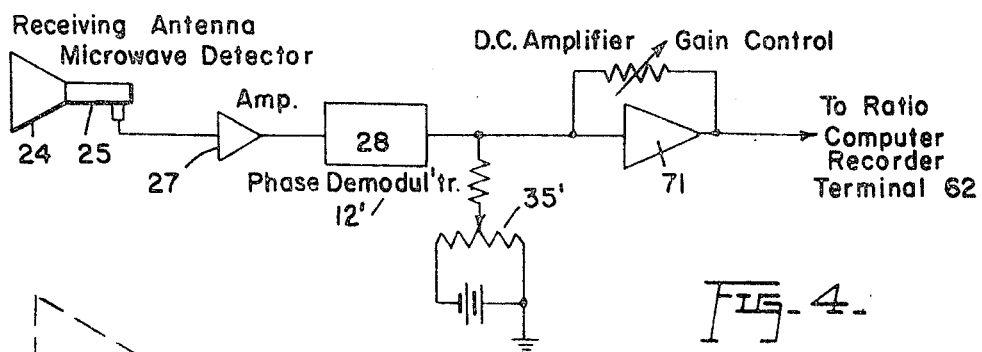
FIG-4.
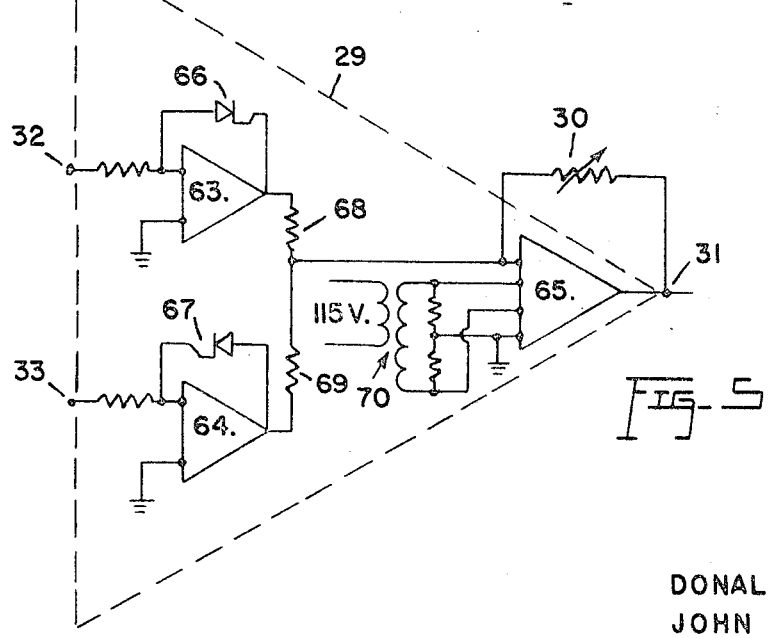
FIG-5.

United States Patent Office 3,460,030
Patented Aug. 5, 1969

3,460,030
METHOD AND APPARATUS FOR MEASURING THE PERCENT MOISTURE CONTENT IN PROCESS MATERIAL UTILIZING MICROWAVE ABSORPTION AND A DIVERSE RADIANT ENERGY ABSORPTION TECHNIQUE
Donald C. Brunton and John M. Richter, Columbus, Ohio, assignors to Brun Sensor Systems, Inc., Columbus, Ohio, a corporation of Ohio
Filed Oct. 22, 1965, Ser. No. 501,002
Int. Cl. G01g 9/00
U.S. Cl. 324—58.5    8 Claims

ABSTRACT OF THE DISCLOSURE

A method and apparatus for measuring the percent moisture in a process material which includes a microwave absorption measuring technique and apparatus for measuring the weight of the moisture content in the process material, a diverse radiation absorption measuring technique and apparatus for measuring the moist weight of the process material, a ratio computing step and apparatus for taking the ratio of the weight of moisture to the moist weight of the process material.

---

This invention relates to a method and means for the measurement of percent moisture content in materials over a wide range of moisture content and material density. The invention is especially applicable, but not limited, to the measurement of percent moisture content in bulk materials such as tobacco, granular, powder and fibrous materials. It is also applicable to the measurement of the percent water content in liquids.

The measurement of moisture in bulk materials with microwave beams has been described in U.S. Patent No. 2,659,860 by W. McSwain Breazeale. Likewise the measurement of mass of bulk materials by such means as an X-ray beam has been described by Charles W. Clapp in U.S. Patent No. 2,723,350.

The present invention combines such measurements in a unique manner so as to produce a measurement of percent moisture over a wide range of moisture content and material density.

Contained as part of this invention is a unique manner for the stabilization of the microwave signal transmitted through the material. Because of this stabilizing feature the percent moisture measurement is not dependent on the stability of the microwave signal generator or the stability of the microwave receiver. This invention also includes means for linearizing the output of the microwave gauge and/or the gamma ray mass gauge in order to permit an accurate time average of the signal when the percent moisture and/or the density of the material in the beams is changing over a wide range. The linearizing means is necessary in order to obtain linear function output signals from non-linear function input signals in order that a ratio signal of two input functions may be obtained which represents percent. The term "linearizing means" as used in this specification refers to any means which takes a non-linear function input signal and gives a linear output function signal.

It is an object of this invention that means are provided to measure the ratio of the microwave signal to the mass gauge signal so as to obtain a direct signal output of percent moisture.

It is likewise an object of this invention that means are provided to obtain the moisture absorption signal and the mass absorption signal as signals strictly proportional to the total moisture and total mass, respectively, of the material being measured. Otherwise the output ratio cannot be a true representative of percent moisture.

It is another object of the invention to provide means for continuous measurement of percent moisture of materials in industrial process lines.

It is another object of the invention to provide means for continuous measurement of percent moisture of materials in order to obtain a moisture measurement signal which can be used for automatic control in industrial processes.

It is another object of this invention to provide means for automatically stabilizing the equipment and compensating for external variables such as temperature, line voltage and aging which effect the equipment components.

With the foregoing objects and features in view and such other objects and features as may become apparent as this specification proceeds, the invention will be understood from the following description taken with the accompanying drawings, wherein like characters of reference are used to designate like parts, and wherein:

FIG. 2 is a schematic block diagram of means for adapting the apparatus shown in FIG. 1 to measure percent moisture where percent moisture is defined as the weight of moisture divided by the total weight of process material minus the weight of moisture times one hundred.

FIG. 3 is a schematic diagram of a typical phase demodulator circuit which may be used in this invention.

FIG. 4 is a schematic block diagram of a modified microwave receiver which may be substituted for the microwave receiver shown in FIG. 1 under certain conditions in accordance with this invention.

FIG. 5 is a schematic block diagram of a typical logarithmic amplifier system which may be used in this invention.

Figure 1:
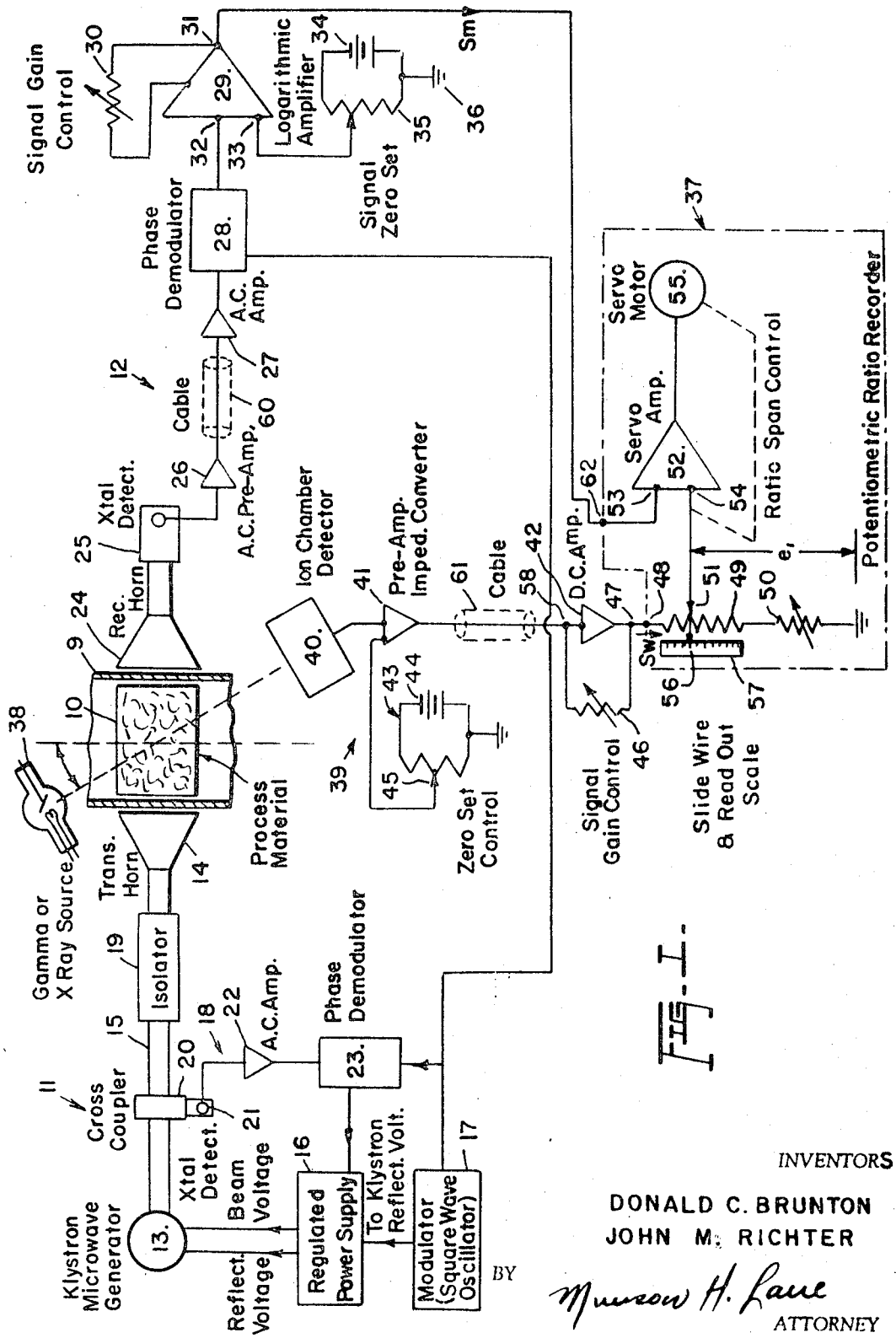
FIG. 1 is a schematic block diagram of the apparatus for measuring percent moisture content of material constructed in accordance wtih the invention.

The method and apparatus for measuring the percent moisture content within a mass of process material such as tobacco is illustrated in FIG. 1 of the drawings.

The term "process material" as used in this specification includes any material containing water through which microwaves may pass with a measurable absorption of the microwave energy by the water content present in the material, and through which radiations selected from the group including X-rays, gamma rays and beta rays may pass with a measurable absorption of the radiation energy as a function of the weight of the process material. In many industrial processes it is desirable to continuously obtain percent moisture measurements of the moisture content of a continuous stream of process material, such as, but not limited to, powders, granular, fibrous and liquid materials. The method and apparatus described in the following description is particularly adapted for continuousiy measuring the percent moisture content of a moving stream of process material such as might be confined within a chute or a conveyor trough 9, as shown in FIG. 1. It is also adapted for measuring the percent moisture content of a specific sample of material of known or unknown volumetric quantity.

The preferred embodiment of this invention as shown in FIG. 1 is adapted to measure percent moisture, where the term "percent moisture" may be defined as equal to the weight of water, $m$, in the process material divided by the total weight, $w$, of the process material (including the water content weight) times one hundred. This definition is the accepted definition of the paper and tobacco industries but not of the lumber and plywood industries. It is contemplated that the apparatus shown in FIG. 1 may be readily modified, for example, as shown in FIG. 2, in order to measure percent moisture when percent moisture is defined as equal to the weight of water, m, in the process material divided by the total weighth of process material w, minus the weight of water, m, times one hundred. The latter definition is commonly used by the lumber industry.

Except when otherwise stated, the term "percent moisture" when used in this specification will be defined according to the former definition, i.e.:

$$\text{percent moisture} = \frac{m}{w} \times 100$$

In accordance with this invention, it is desired to obtain an output ratio R which is equal to the weight, m, of moisture within a unit volume of process material 10 divided by the weight, w, per unit volume of the process material. The measurement of the weight, m, of moisture within a unit volume of process material is obtained by electromagnetic microwave absorption measurement means. The measurement of the density, or the weight, w, per unit volume of the process material is obtained by radiation absorption measurement means utilizing radiations emitted from sources selected from the group including gamma, beta, and X-ray radiation sources. The ratio of the two measurements, i.e. R=m/w, may be obtained electrically by applying the electrical measurement signal proportional to moisture content, m, and the electrical measurement signal proportional to process material density, w, to an electrical ratio determining means such as, but not limited to, a potentiometric ratio recorder. By calibrating the output indicator of the ratio determining means in percent increments, the percent measurement of moisture content within a mass of process material can be obtained.

The electromagnetic microwave absorption measuring means includes a microwave transmitter 11 located on one side of the process material 10 and a microwave receiver 12 located on the opposite side of the process material.

The microwave transmitter includes a microwave generator means 13, preferably a conventional klystron microwave generator, a transmitter horn 14 or other antenna means connected to the output of the microwave generator by means of a suitable microwave conductor 15, a regulated power supply for supplying the klystron reflector voltage and the klystron beam voltage, a modulator square wave oscillator 17 for modulating the reflector voltage, and a microwave stabilization circuit 18. The transmitter horn 14 is positioned on one side of the process material so that it directs a microwave beam through the process material. Preferably an isolator 19 is interposed between the microwave generator and the transmitter horn for superior performance. An isolator will be understood by those skilled in the art to be a device which allows the generated microwaves to pass in one direction toward the transmitter antenna, but which will not pass reflected waves from the antenna back into the transmitter system, but the isolator is not essential to satisfactory operation. The microwave signal generated by the klystron is preferably modulated by means of a square wave oscillator 17 which superimposes its square wave output voltage on the reulator 17 also furnishes square wave signals to phase deflector voltage in the regulated power supply 16. The mod- modulators 23 and 28 in the microwave stabilization circuit and in the microwave receiver respectively.

The microwave stabilization circuit 18 includes a cross coupler 20 connected in the microwave conductor 15, a crystal detector 21, an A.C. amplifier 22 and a phase demodulator 23. The components of the stabilization circuit are connected in series circuit between the microwave generator output conductor 15 and the regulated power supply 16. The output voltage from the microwave generator is coupled by the cross coupler 20 to the crystal detector 21, which detects, i.e. rectifies, the microwave and passes the modulation signal. The detected signal is amplified by A.C. amplifier 22, demodulated by phase demodulator 23 and fed to the regulated power supply 16 to supply a reference voltage in a conventional voltage regulator circuit for the voltage supply to the microwave generator. Hence, the power output of the microwave generator is made by this feed-back circuit dependent only on the signal conversion efficiency of the crystal detector. The purpose of the microwave stabilization circuit will be further explained after the microwave receiver has been described.

The phase demodulators used in this invention provide the following important functions (1) they give a D.C. output voltage which is directly proportional to the A.C. input signal, and (2) they substantially eliminate noise. A typical phase demodulator circuit which may be used in the invention is shown in FIG. 3. It is not intended that the invention be limited to a particular demodulator circuit since other known demodulator circuits could be substituted for the one shown in FIG. 3. However, the demodulator shown in FIG. 3 is a simple circuit which gives the desired results.

The microwave receiver 12 includes a receiver antenna 24 which is located on the side of the process material opposite the transmitter horn 14 and is directed in axial alignment with the transmitter horn in order to receive the microwave beam transmitted by the transmitter horn after it has passed through the process material. The microwave beam received by the receiver antenna is detected by a crystal detector 25. The detected signal is amplified by an A.C. pre-amplifier 26, further amplified by an A.C. amplifier 27 and demodulated by a phase demodulator 28. The demodulated signal is linearized by means of a linearizing means 29, such as a logarithmic amplifier system which has a signal gain control variable resistor 30 in a feed-back circuit from the amplifier output 31. The linearized signal output from amplifier 29 is fed to one input terminal 53 of a servoamplifier 52 in a potentiometric ratio recorder 37 subsequently to be described.

In order to establish a zero moisture signal output, $S_m = 0$, from the linearizing means, a zero set bias voltage supply is connected thereto. This bias voltage supply includes a direct current voltage source 34 across which is connected a zero set control potentiometer 35. The positive side of the direct current source and zero set potentiometer is connected to ground 36. By adjusting the zero set control potentiometer a bias voltage can be fed to the linearizing means 29 to obtain a zero moisture signal output therefrom.

Although the invention is not limited to the use of a specific linearizing means 29 for obtaining an output signal which is a linear function of a non-linear function input signal, one embodiment of such linearizing means is illustrated in FIG. 5.

The circuit shown in FIG. 5 is a specific adaptation of the logarithmic amplifiers described in Bulletin PL1 and PPL1/5B1, Rev. 1 May 1965 published by Philbrick Researches, Inc. for use in this invention.

The linearizing means 29 shown in FIG. 1 is outlined by the dotted line shown in FIG. 5 and includes a pair of logarithmic amplifiers 63 and 64 connected in a balanced summation circuit including resistors 68 and 69, and a chopper stabilized linear amplifier 65, which is driven by a chopper drive transformer 70 connected to a 115 v. A.C. supply. The logarithmic amplifiers 63 and 64 are Philbrick Researches, Inc. amplifiers, Models P65AU with diodes 66 and 67 connected across amplifiers 63 and 64 respectively. The signal from the phase demodulator 22 which is a function of the weight of moisture in the process material is fed to the input terminal 32 of the logarithmic amplifier 63. The zero set voltage from the zero set potentiometer 35 is fed into logarithmic amplifier 64 for purpose of balance, and the output therefrom is subtracted from the output of logarithmic amplifier 63 in the balanced resistor network 68 and 69. The difference voltage is then fed to the chopper stabilized amplifier 65 which amplifies the signal to a usable level.

The signal conversion coefficient of the crystal detector 25 in the microwave receiver is subject to change with temperature and aging. Unless some means is provided for correcting the signal to compensate for the change in conversion coefficient of the receiver crystal detector 25, the moisture measurement means is subject to error. In order to provide the required compensation, this invention includes the microwave stabilization circuit in the microwave transmitter. The crystal detector 21 in the microwave stabilization circuit and the receiver crystal detector 25 are temperature coefficient matched crystal detectors. The conversion coefficient of both detectors will change in the same way with temperature change and aging. It has been stated in the description of the microwave stabilization circuit that the power output of the microwave transmitter is made, by the feed-back characteristics of the microwave stabilization circuit, dependent only on the signal conversion efficiency of the crystal detector 21. But the power received at the amplifier 26 in the microwave receiver is likewise dependent on the signal conversion efficiency of the receiver crystal detector 25. Since the conversion coefficients of the matched crystal detectors 21 and 25 vary alike with temperature change, a voltage compensation in the regulated power supply 16 of the microwave transmitter to effect an increased or decreased voltage output from the transmitter to insure a constant signal output from the detector 21 will likewise insure a constant signal output from the receiver crystal detector provided the attenuation of the signal by the process material remains constant. For example, if a temperature change causes a decrease in the signal conversion efficiency of the crystal detector 21, the decrease in voltage to the power regulator 16 will result in an increase in voltage to the microwave generator. The resultant increase in output of the transmitter 11 is in turn affected by the decreased conversion efficiency of the receiver crystal detector 25 so that the signal output of the receiver crystal detector 25 is unchanged. Hence, the stabilization method provided by this invention determines that for a constant microwave absorption by the process material, the received signal remains constant independent of temperature or aging of the primary detection elements or the transmitter output.

The radiation absorption measurement means for measuring the density of the process material includes a radiation source 38, and a radiation receiver 39. The radiation source may be selected from gamma, beta or X-ray radiation sources. The radiation source is positioned on one side of the process material and the radiation detector on the opposite side. The radiation beam may penetrate the process material at an angle, as shown, of about 45 degrees from the direction of a continuously moving stream of the material. The angle of penetration is not critical and may even be 90 degrees and the radiation beam may be radiated through the microwave antenna. When there are sharp changes in the density of a stream of process material, it will be desirable that the radiation beam and the microwave beam be superimposed so that they pass through the material along the same path. However, using the angled beam, as shown, places the radiation beam out of the way of the microwave system and increases the path length of the radiation beam which is usually desirable. This path length should be about one relaxation length where possible, for gamma rays emanating from a $Cs^{137}$ source. One relaxation length is about four inches in material of unit specific gravity.

The radiation receiver includes a radiation detector 40, a pre-amplifier and impedance converter 41, and a linearizing amplifier 42 connected in series.

The radiation detector shown is an ion chamber detector 40, but it could be another known type radiation detector. The signal from the radiation detector varies in proportion to the variation in intensity of the radiation beam received by the detector. The radiation intensity received in turn varies in proportion to the radiation absorbed by the process material. Where the range of radiation absorption due to changes of density in the process material is small, the output signal is essentially linear with material density. The pre-amplifier 41 is used to amplify the detected signal output from the radiation detector.

In order to establish a zero mass signal output, $S_w=0$, from the pre-amplifier 41, a zero set bias supply is connected thereto. This bias voltage supply 43 includes a direct current voltage source 44 across which is connected a zero set control potentiometer 45. The positive side of the direct current source and zero set potentiometer is connected to ground. By adjusting the zero set control potentiometer a bias voltage can be fed to the pre-amplifier 41 to obtain a zero mass signal output therefrom.

The mass signal from the pre-amplifier 41 is fed to a linear D.C. amplifier 42. A signal gain control variable resistor 46 is connected in a feed-back circuit between the output side 47 and input side 58 of the D.C. amplifier 42.

The mass signal output, $S_w$, from the amplifier 42 is fed as a second input to the potentiometer ratio recorder 37.

The potentiometric ratio recorder includes a calibrated slide wire potentiometer 49 connected in series with a variable resistor 50 between the mass signal input terminal 48 and ground, a servo-amplifier 52 and a servo motor 55 which is mechanically connected with the sliding contact 51 of the slide wire potentiometer to vary the position of sliding contact. The slide wire potentiometer 49 and the variable resistor 50 serve as a voltage divider network across which the mass signal output, $S_w$, is applied. The adjustable contact 51 of the voltage divider network selects an adjustable portion $e_1$ of the mass signal, $S_w$. The voltage $e_1$ and the moisture signal $S_m$ are applied to separate terminals 54 and 53 respectively of the servo-amplifier which amplifies any difference voltage between the two signals $S_m$ and $e_1$. The output voltage from the servo-amplifier 52 is fed to the servo motor 55 whose direction of rotation is determined by the polarity of the output signal from the servo-amplifier. The servo motor moves the sliding contact 51 until the difference voltage between $S_m$ and $e_1$ is zero and no output voltage from the servo-amplifier is applied to the servo motor.

The position of the sliding contact 51 on the resistance wire of the potentiometer 49 is an indication of the ratio of the two input signals $S_m$ and $S_w$ applied to the ratio recorder 37. A pointer 56 mechanically connected to the sliding contact 51 moves over a calibrated scale 57 to indicate the ratio $S_m/S_w$ in terms of percent moisture in the process material.

The potentiometer ratio recorder shown in FIG. 1 is a commercially available ratio recorder. A scribing pin, not shown, but mechanically connected to the sliding contact 51 can be used to record the precent moisture content of the process material on a suitably calibrated graph. Other known types of ratio circuits can be substituted for the potentiometric ratio recorder shown.

One type of potentiometric ratio indicator is described in U.S. Patent No. 2,454,520 issued to David W. Moore, Jr. Nov. 23, 1948 and assigned to Fairchild Camera and Instrument Corporation.

Considering the development of the mathematical expressions for the ratio output where the ratio, $R=m/w$, and where $m$ is the value of the weight per unit volume of the moisture content of the process material, and $w$ is the weight per unit volume of the process material in terms of the electrical voltage signals, $S_m$ and $S_w$, derived from the moisture measurement means and the process material weight measurement means, the requirements for a gauge to measure percent moisture becomes apparent.

As stated above, the desired output ratio is: $R=m/w$.

Using a standard sample where values of moisture content $m_0$ and process material weight $w_0$ in gms./cm.$^2$ are known for a percent value at the lower end of the percent moisture scale, the output ratio can be expressed as:

(1) $$R = \frac{m_0 + \Delta m}{w_0 + \Delta w}$$

In general the moisture measurement voltage signal $S_m$ is expressed by the equation:

(2) $$S_m = a - k_m m$$

By use of a balancing voltage in the moisture measurement voltage signal $S_m$, applied as previously described as a bias voltage to the logarithmic amplifier 29, the moisture signal $S_m$ is made equal to zero for $m = m_0$. Therefore:

(3) $$a = k_m m_0$$

and substituting the value of $a$ from Equation 3 in Equation 2

$$S_m = k_m(m - m_0) = -k_m \Delta m$$

A second standard sample is used to give a value of the moisture voltage signal $S_m$ for a second moisture level such that $S_{m_1} = k_m m_1$. From the linearity of the output voltage, the voltage $S_m$ corresponding to $m = m_0$ can be determined and is expressed by the equation:

$$S_{m_0} = S_{m_1} \frac{m_0}{\Delta m} = -K_m m_0$$

Similarly, the mass signal $S_w$ for the process material is given by the equation:

$$S_w = K_w \Delta w$$
$$S_{w_1} = -K_w \Delta w_1$$
$$S_{w_0} = S_{w_1} \frac{w_0}{\Delta w_1} = -K_w w_0$$

Then the ratio, 
$$R = \left[ \frac{-\frac{S_{m_0}}{K_m} - \frac{S_m}{K_m}}{-\frac{S_{w_0}}{K_w} - \frac{S_w}{K_w}} \right]$$
$$= \frac{K_w}{K_m} \cdot \frac{S_{m_0} + S_m}{S_{w_0} + S_w}$$
$$= \frac{S_{w_1} \Delta m_1}{\Delta w_1 S_{m_1}} \cdot \frac{S_{m_0} + S_m}{S_{w_0} + S_w}$$

Hence, the complete solution for a gauge to measure percent moisture requires two linearizing amplifiers, two bias voltage supplies and a ratio device in addition to the two primary measurements of moisture and weight. In certain cases the range of moisture or weight of process material may be so restricted that it is possible to dispense with one log amplifier.

In the case where the logarithmic amplifier is omitted from the weight of process material measuring means, the ratio R becomes:

$$R = \frac{m_0 + m}{w}$$

but a balancing circuit in the weight of process material measuring means permits that $S_w = 0$ for $w = 0$ or $S_w = -K_w w$:

$$\therefore R = \frac{K_w S_{m_0} + S_m}{K_m S_w}$$

In order that the potentiometric ratio recorder 37 may be located at a remote point from the microwave transmitting and receiving horns and at a distance from the gamma or X-ray source the detector cables 60 and 61 are provided in the microwave receiver 12 and radiation receiver 39 respectively. The cable 60 connects the pre-amplifier 26 with the A.C. amplifier 27 in the microwave receiver, and the cable 61 connects the pre-amplifier impedance converter 41 with the D.C. amplifier 42 in the radiation receiver.

In the measurement of moisture in process material it is desirable to distinguish between two extremes, one, where there is a large amount of water present and hence a large attenuation of the transmitted microwave signal and two, where there is a small amount of water present in the process material and a small attenuation of the transmitted signal. The choice of wavelength in the microwave region may be made to give large attenuation on a given thickness material on a process line.

The apparatus shown in FIG. 1 is particularly suited for the measurement of moisture in process material where there is a relatively large amount of water present in the process material and hence there is a relatively large attenuation of the transmitted microwave signal which is passed through the process material.

In a specific case using the apparatus in FIG. 1, the measurement of a continuous stream of relatively moist tobacco confined within the walls 9 of a conveyor trough can be made by passing 3 cm. microwaves through a layer of tobacco approximately six inches across. The amount of water per cubic centimeter in the tobacco at right angles to the microwave beam is determined by the magnitude of the received signal in the microwave receiver. For best results the trough walls 9 containing the tobacco should be approximately one-half wavelength thick where the wavelength to be considered is the wavelength in the wall material at the frequency of the transmitter. The path length of the microwave in tobacco should produce a beam attenuation of 30 db or more for high accuracy. The actual length will be dependent on the average percent moisture of the tobacco and the mean density of the tobacco. In actual practice the path length through the tobacco may be varied from about four inches to sixteen inches.

The apparatus shown in FIG. 1 may be modified by substituting a microwave receiver 12' shown in FIG. 4 for the microwave receiver 12 shown in FIG. 1 to measure percent moisture when the moisture content in the process material is low and only a small attenuation of the transmitted microwave signal by the moisture in the process material is obtained. In such a case the signal transmitted through the material is large and little or no amplification before the demodulator 28 is required. The microwave receiver circuit shown in FIG. 4, prior to the phase demodulator 28, is like the microwave receiver circuit shown in FIG. 1 except that the pre-amplifier 26 is omitted, and amplifier 27 is optional. After the phase demodulator 28 a D.C. amplifier is substituted in FIG. 4 for the linearizing means 29 in FIG. 1 and a D.C. bias voltage from a bias voltage supply 35' is applied to the D.C. output of the demodulator to cancel out most of the incoming signal. The resultant signal is therefore one which is a small signal but the variations in the signal due to percent moisture are now relatively large. Since the absorption by the material is small, this output signal is essentially linear with absorption and no linearizing stage is required. However, because the signal is small a stable D.C. amplifier 71 is required. It should be noted that the D.C. bias voltage 35' may be derived from the microwave source itself rather than from a battery. The microwave output from the source is divided into two branches one feeding the transmitting horn and the other going via a variable alternator to a second detector. The alternator is adjusted until both output signals are equal for zero moisture in the material being measured and the relative change in the two signals is amplified and fed to the ratio computer recorder.

The apparatus shown in FIG. 1 may also be modified to obtain a moisture measurement when percent moisture is defined as water weight/(total weight of process material minus water weight) times one hundred, by opening the circuit between points 47 and 48 in FIG. 1, and connecting the terminals 47, 48 and 62 of the apparatus shown in FIG. 2 to corresponding terminals shown in FIG. 1. As shown in FIG. 2 the moisture signal, $S_m$, from terminal 62 is passed through a phase reversal stage 72 and then to a summing amplifier 73. The weight of process material signal, $S_w$, from the terminal 47 is also fed to the summing amplifier where the negative signal, $-S_m$, is combined with the signal $S_w$ to produce a resultant signal $S_w-S_m$, corresponding to the weight of process material minus the weight of moisture. This signal is applied to terminal 48 at the top end of the resistance wire of the potentiometer 49. The potentiometric ratio recorder 37 then takes the ratio of the signal $S_m$ and $S_w-S_m$, and indicates and records the percent moisture as a function of $S_m/S_w-S_m$ in the same manner as described for the apparatus in FIG. 1 which indicates and records percent moisture as a function of $S_m/S_w$.

Whereas the detectors described throughout this specification are described as crystal detectors, other types of microwave detectors, such as bolometers can be used within the scope of this invention.

The components of this invention which are shown in block, or by conventional symbols in FIG. 1 are all conventional components which are generally available commercially. Since these components are not per se the subject of the invention, a detailed description and illustration of the components has not been considered necessary for a clear understanding of the invention. Rather it is believed that a detailed description of the conventional components would lead to a confused understanding of the invention.

The term "moist weight of process material" as used in the claims refers to the weight of the material and any water therein.

What is claimed is:

1. Apparatus for measuring the moisture content in process material comprising a microwave transmitter means for transmitting microwaves through the process material, and a microwave receiver means for receiving the microwaves after they have passed through the process material, and producing an electrical voltage signal which is a function of the moisture content in said process material, said receiver means including a microwave receiving antenna and a receiver microwave detector, said microwave transmitter means including a microwave generator means, a microwave transmitting antenna connected to said microwave generator means, a regulated power supply for said microwave generator, and a microwave stabilization means for detecting the power output of said microwave generator means and supplying a reference voltage to said regulated power supply to effect an increase or decrease in the power supply voltage output to said microwave generator for maintaining a constant voltage level output from said microwave generator under constant conditions affecting the conversion efficiency of said stabilization means, said microwave stabilization means including a stabilizing microwave detector coupled to detect the output voltage of said microwave generator, said stabilizing detector and said receiver detector being temperature coefficient matched detectors, whose conversion efficiency varies similarly with temperature change and aging so that when the conversion efficiency of the receiver detector varies the conversion efficiency of the stabilizing detector will vary similarly and effect a compensating reference voltage in the stabilizing means to cause an increase or decrease in the output voltage of the microwave generator means thereby compensating for the change in conversion efficiency of the receiver detector.

2. Apparatus for measuring the moisture content in process material comprising a microwave transmitter means for transmitting microwaves through the process material, and a microwave receiver means for receiving the microwaves after they have passed through the process material, and producing an electrical voltage signal which is a function of the moisture content in said process material, said receiver means including a microwave receiving antenna and a receiver microwave detector, said microwave transmitter means including a microwave generator means, a microwave transmitting antenna connected to said microwave generator means, a regulated power supply for said microwave generator, and a microwave stabilization means for detecting the power output of said microwave generator means and supplying a reference voltage to said regulated power supply to effect an increase or decrease in the power supply voltage output to said microwave generator for maintaining a constant voltage level output from said microwave generator under constant conditions affecting the conversion efficiency of said stabilization means, said microwave receiver means also including means for linearizing the voltage signal output from said receiver detector.

3. The apparatus set forth in claim 2 wherein said linearizing means comprises a logarithmic amplifier.

4. The apparatus set forth in claim 2 together with means for providing a zero moisture signal output for a moisture condition of the process material at the low point in the range of moisture conditions for which measurement is being made.

5. Apparatus for measuring the percent moisture content in a process material comprising a microwave transmitter means for transmitting electromagnetic microwaves through the process material, a microwave receiver means for receiving the microwaves after they have passed through the process material and producing an electrical voltage output signal, $S_m$, which is proportional to the moisture weight, $m$, in the process material, means for transmitting radiations of a type diverse from said microwaves through said process material, said diverse radiations being of a type whose intensity is attenuated when the radiations pass through the process material as a function of the moist weight of the process material, radiation receiver means for detecting radiations after they have passed through the process material and producing an electric voltage output signal, $S_w$, which is proportional to the moist weight, $w$, of the process material, and ratio computing and indicating means for computing the ratio, $R=S_m/S_w$, of the voltage signals $S_m$ and $S_w$ and indicating the resultant in terms of percent moisture, both the microwave receiver means and the radiation receiver means including means for linearizing their voltage signal outputs.

6. Apparatus for measuring the percent moisture content in a process material comprising a microwave transmitter means for transmitting electromagnetic microwaves through the process material, a microwave receiver means for receiving the microwaves after they have passed through the process material and producing an electrical voltage output signal, $S_m$, which is proportional to the moisture weight, $m$, in the process material, means for transmitting radiations of a type diverse from said microwaves through said process material, said diverse radiations being of a type whose intensity is attenuated when the radiations pass through the process material as a function of the moist weight of the process material, radiation receiver means for detecting radiations after they have passed through the process material and producing an electric voltage output signal, $S_w$, which is proportional to the moist weight, $w$, of the process material, and ratio computing and indicating means for computing the ratio, $R=S_m/S_w$, of the voltage signals $S_m$ and $S_w$ and indicating the resultant in terms of percent moisture, said microwave transmitter means including a microwave generator means, a microwave transmitting antenna connected to said microwave generator means, a regulated power supply for said microwave generator and a microwave stabilization means for detecting the power output of said microwave generator means and supplying a reference voltage to said regulated power supply to effect an increase or decrease in the power supply voltage output to said microwave generator for maintaining a constant voltage level output from said microwave generator under constant conditions affecting the conversion efficiency of said stabilization means, said microwave receiver means including a microwave receiver antenna and a receiver microwave detector, and wherein said microwave stabilization means includes a stabilizing detector coupled to detect the output voltage of said microwave generator, said stabilizing detector and said receiver microwave detector being temperature coefficient matched detectors, whose conversion efficiency varies similarly with temperature change and aging so that when the conversion efficiency of the receiver detector varies the conversion efficiency of the stabilizing detector will vary similarly and effect a compensating reference voltage in the stabilizing means to cause an increase or decrease in the output voltage of the microwave generator means thereby compensating for the change in conversion efficiency of the receiver detector.

7. A method for continuously determining the percent moisture in a moving stream of process material containing a small percent moisture by a microwave measurement technique and a diverse radiation measurement technique comprising:
(a) generating electromagnetic microwaves of such frequency that the microwaves when transmitted through the process material containing a small percent water are absorbed as a function of the content of the water present in the process material,
(b) modulating the electromagnetic microwaves,
(c) transmitting the modulated electromagnetic microwaves transversely through the process material, said transmitted microwaves, because of the small percentage of moisture in the process material, being attenuated only to a small amount compared to the transmitted microwave signal as a result of absorption by the moisture in the process material,
(d) detecting the microwaves after they have passed through the process material, and obtaining a voltage signal, $S_m$, which is a function of the weight of moisture in the process material,
(e) rectifying the detected signal,
(f) cancelling out most of the rectified signal with a D.C. bias voltage to produce a resultant signal which is a small signal compared to the detected signal but in which the variations as a result of moisture absorption of the microwaves is relatively large,
(g) amplifying the resultant signal to a usable level to obtain a voltage signal $S_m$,
(h) passing radiations of a diverse type from said microwaves through said process material, said diverse radiations being of a selected type such that the intensity of the radiations is attenuated when the radiations pass through the process material as a function of the moist weight of the process material,
(i) detecting the radiations after they have passed through the process material and obtaining a voltage signal, $S_w$, which is a function of the moist weight of process material,
(j) electrically computing the ratio of the voltage signals $S_m$ and $S_w$, and
(k) indicating the ratio $S_m/S_w$ in terms of percent moisture content.

8. A method for continuously determining the percent moisture in a moving stream of a process material containing a large percent moisture by microwave and radiation measurement techniques comprising:
(a) generating electromagnetic microwaves of such frequency that the microwaves when transmitted through the process material containing water are absorbed as a non-linear function of the content of the water present in the process material,
(b) modulating the generated electromagnetic microwaves,
(c) transmitting the modulated electromagnetic microwaves transversely through the process material, said transmitted microwaves after passing through the process material being attenuated to a large degree as a result of absorption by the large amount of moisture present in the process material,
(d) detecting the modulated electromagnetic microwaves after they have passed through the process material, and obtaining an electric moisture weight signal which varies as a non-linear function of the weight of water in said process material,
(e) rectifying the electric moisture weight signal,
(f) linearizing the rectified moisture weight signal and obtaining a resultant signal, $S_m$, which is a proportional function of the weight of moisture in said process material,
(g) passing radiations of a diverse type from said microwaves through said process material, said diverse radiations being of a selected type such that the intensity of the radiations is attenuated when the radiations pass through the process material as a function of the moist weight of the process material,
(h) detecting the radiations after they have passed through the process material and obtaining a voltage signal, $S_w$, which is a function of the moist weight of process material,
(i) electrically computing the ratio of the voltage signals $S_m$ and $S_w$, and
(j) indicating the ratio $S_m/S_w$ in terms of percent moisture content.

References Cited
UNITED STATES PATENTS

| | | | |
|---|---|---|---|
| 2,659,860 | 11/1953 | Breazeale | 324—58.5 |
| 3,034,046 | 5/1962 | Sasaki | 324—58.5 |
| 3,068,398 | 12/1962 | Shoolery et al. | |

OTHER REFERENCES
Hewlett-Packard Journal, vol. 16, No. 6, February 1965, pp. 3 and 4.

RUDOLPH V. ROLINEC, Primary Examiner

P. F. WILLE, Assistant Examiner

U.S. Cl. X.R.

250—83